US008645303B2

(12) United States Patent
Watanabe et al.

(10) Patent No.: US 8,645,303 B2
(45) Date of Patent: Feb. 4, 2014

(54) METHODS AND SYSTEMS FOR CREATING, ACCESSING, AND COMMUNICATING CONTENT

(75) Inventors: Tim Watanabe, San Jose, CA (US); Kenneth Poray, Point Pleasant Beach, NJ (US); Craig So, San Jose, CA (US); Ryan Menda, San Jose, CA (US); Brian Eastley, Cary, CA (US)

(73) Assignee: Advance Response, LLC., San Jose, CA (US)

( * ) Notice: Subject to any disclaimer, the term of this patent is extended or adjusted under 35 U.S.C. 154(b) by 333 days.

(21) Appl. No.: 12/476,017

(22) Filed: Jun. 1, 2009

(65) Prior Publication Data

US 2010/0306154 A1    Dec. 2, 2010

(51) Int. Cl.
*G06F 17/00*    (2006.01)
*G06N 5/02*    (2006.01)

(52) U.S. Cl.
USPC ........................................................ 706/47

(58) Field of Classification Search
USPC ........................................................ 706/47
See application file for complete search history.

(56) References Cited

U.S. PATENT DOCUMENTS

| 2003/0055974 | A1* | 3/2003 | Brophy et al. ................. 709/227 |
| 2003/0185232 | A1* | 10/2003 | Moore et al. .................. 370/465 |
| 2004/0078340 | A1 | 4/2004 | Evans |
| 2007/0038683 | A1* | 2/2007 | Dixon et al. ................... 707/202 |
| 2007/0180386 | A1* | 8/2007 | Ballard et al. ................. 715/744 |
| 2007/0255653 | A1* | 11/2007 | Tumminaro et al. ............ 705/39 |
| 2009/0287617 | A1* | 11/2009 | Schmidt ......................... 706/10 |

OTHER PUBLICATIONS

U.S. Appl. No. 12/546,271, filed Aug. 24, 2009, Timothy Watanabe.
U.S. Appl. No. 12/620,075, filed Nov. 17, 2009, Timothy Watanabe.

* cited by examiner

*Primary Examiner* — Kakali Chaki
*Assistant Examiner* — Ababacar Seck
(74) *Attorney, Agent, or Firm* — Kenneth E. Horton; Kirton McConkie

(57) ABSTRACT

Methods and systems for creating, accessing, and communicating content are described. The systems comprise a single platform that allows multiple coordinated communication channels with a single user device (or user system) or multiple user devices (or user systems) at the same time. The platforms contains a browser for communicating with a communications network, multiple types of servers for handling different communications between the platform and a user device external to the platform, a database for storing content, a speech engine for converting text to speech, for converting speech to text, or both, and a configuration engine for configuring the applications that users will use during interaction with the platform. The platform can accordingly communicate with a user (or a user system) using any desired number (or combination) of communication channels. Other embodiments are described.

7 Claims, 7 Drawing Sheets

METHODS AND SYSTEMS FOR CREATING, ACCESSING, AND COMMUNICATING CONTENT

FIELD

This application relates generally to methods and systems for creating, accessing, and communicating content. In particular, this application relates to methods and systems that allow multiple paths of communication via a single platform that allows users and/or other systems to interact and/or respond with the platform, with the platform reporting the results of that interaction and/or response.

BACKGROUND

Information has traditionally been communicated via methods such as radio, television (TV), telephones, and newspapers. Recently, information has been communicated by more digital mechanisms such as the internet (including web interfaces), email, instant messaging, and text messaging.

Some of these communication methods have been initiated for the purpose of collecting a payment, to an account holder (i.e., a doctor's office) from the account owner (i.e., a patient). These payment communication methods have typically been performed by mail, phone calls, and in certain instances via email. The communication by phone interaction has usually been limited to 1-to-1 phone calls that are manually initiated by a person. The mail and email have likewise been limited to 1-to-1 communications that are typically initiated by a person. During the last several years, interactive voice applications (IVR) have allowed callers to access information over the phone in an automated or semi-automated fashion.

SUMMARY

This application relates to methods and systems for creating, accessing, and communicating content. The systems comprise a single platform that allows multiple communication channels with a single user device or multiple user devices at the same time. The platforms contains a browser for communicating with a communications network, multiple types of servers for handling different communications between the platform and a user device external to the platform, a database for storing content, a data warehouse, a reports server, a speech engine for converting text to speech, for converting speech to text, or both, and a configuration engine for configuring the applications that users will use during interaction with the platform. The platform can accordingly communicate with a user using any desired number (or combination) of communication channels.

BRIEF DESCRIPTION OF THE DRAWINGS

The following description can be better understood in light of the Figures, in which.

Figure 1:
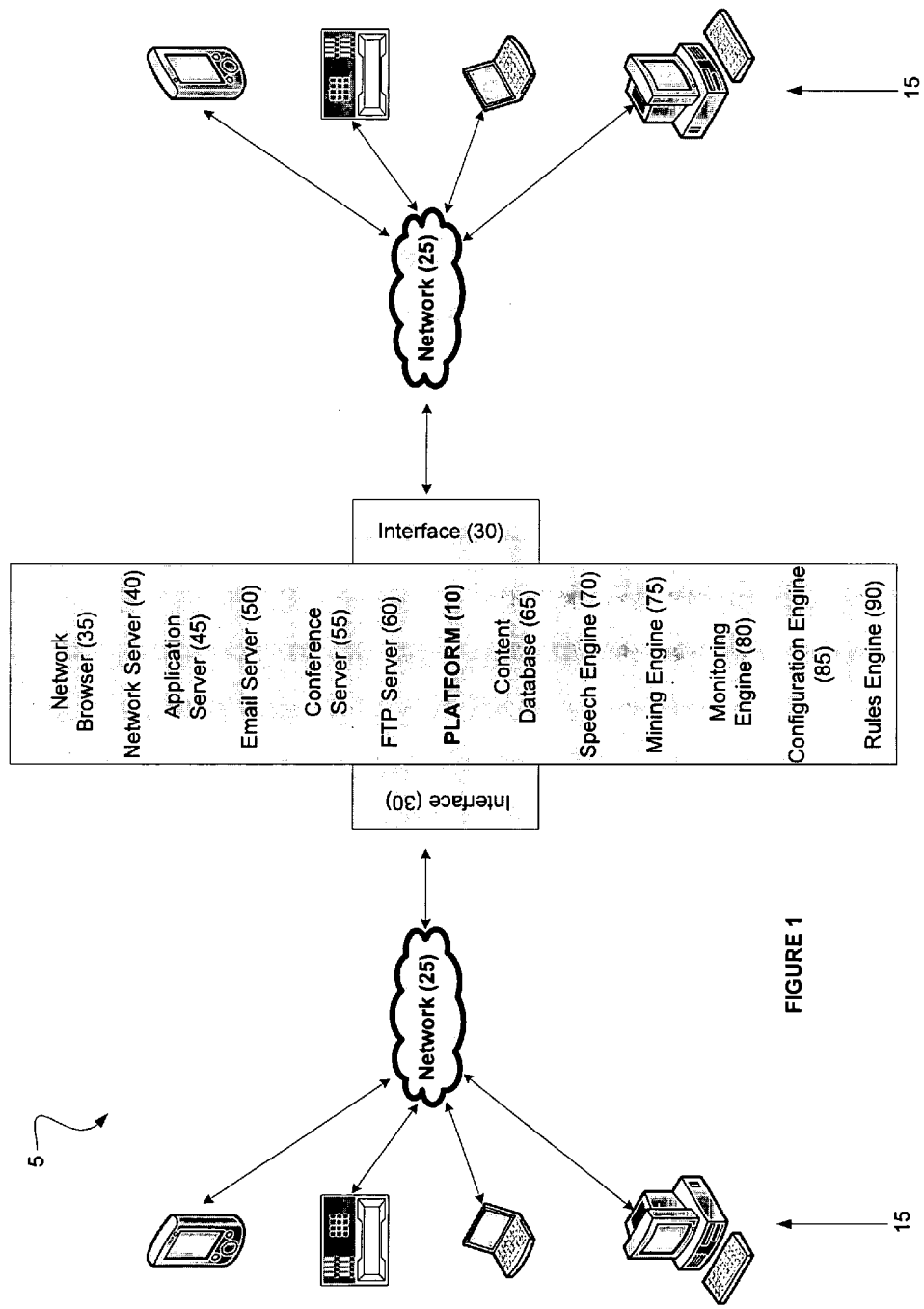
FIG. 1 depicts some embodiments of the systems of creating, accessing, and communicating content.

The Figures illustrate specific aspects of the methods and systems for creating, accessing, and communicating content. Together with the following description, the Figures demonstrate and explain the principles of the methods and apparatus used by these methods. In the drawings, the thickness of layers and regions are exaggerated for clarity. The same reference numerals in different drawings represent the same element, and thus their descriptions will not be repeated.

DETAILED DESCRIPTION

The following description supplies specific details in order to provide a thorough understanding. Nevertheless, the skilled artisan would understand that the apparatus and associated methods of making and using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry. For example, while the description below focuses on using the communication system for payment transactions, it could be used in and applied to other types of transactions, like insurance, medical, or mortgage servicing transactions.

Some embodiments of the methods and systems for creating, accessing, and communicating content are shown in FIGS. 1-7. In these embodiments, the system comprises a platform with functions and services necessary to send and/or receive coordinated encrypted or unencrypted data, text, audio, or visual content. With such a platform, all parties (human or other [like another system]) taking part in the communication can use any desired combination of channels including static, dynamic, manual, or automated communication mechanisms rather than being restricted to a single communication mechanism. In the embodiments shown in FIG. 1, the system 5 comprises a platform 10 that is in communication with various user devices 15 through a communications network 25. In some instances, the user device 15 can itself comprise a user's system that contains multiple components, such as a LAN of an insurance company.

The system can also communicate with other systems/devices like $3^{rd}$ party software including, for example, Lytec, AllScripts, etc. Other examples of other systems/devices include the ability of a user's (including a customer's) existing server to send the platform 10 an alert of low memory. In this case, the system 5 can call a system administrator and, if the administrator provides the proper passcode/command, the platform 10 can restart the ailing server. In some configurations, the system 5 can contain any known ancillary component, such as $3^{rd}$ party software systems or customer software/servers.

Prior to discussing the details of system 5, it should be understood that the following description is presented largely in terms of processes and operations that may be performed by any known computer components. These computer components, which may be grouped in a single location or distributed over a wide area, generally include computer processors, memory storage devices, display devices, input devices, etc. In circumstances where the computer components are distributed, the computer components are accessible to each other via communication links, such as those illustrated in FIG. 2. The system 5 could equally operate within a computer system having a fewer or greater number of components than those illustrated in FIG. 2. Thus, the depiction of system 5 should be taken as illustrative and not limiting. For example, the system 5 could implement various services components and peer-to-peer network configurations to implement at least a portion of the processes. The solution can be used in an "on premise" solution, as well as in a software as a service configuration.

Figure 2:
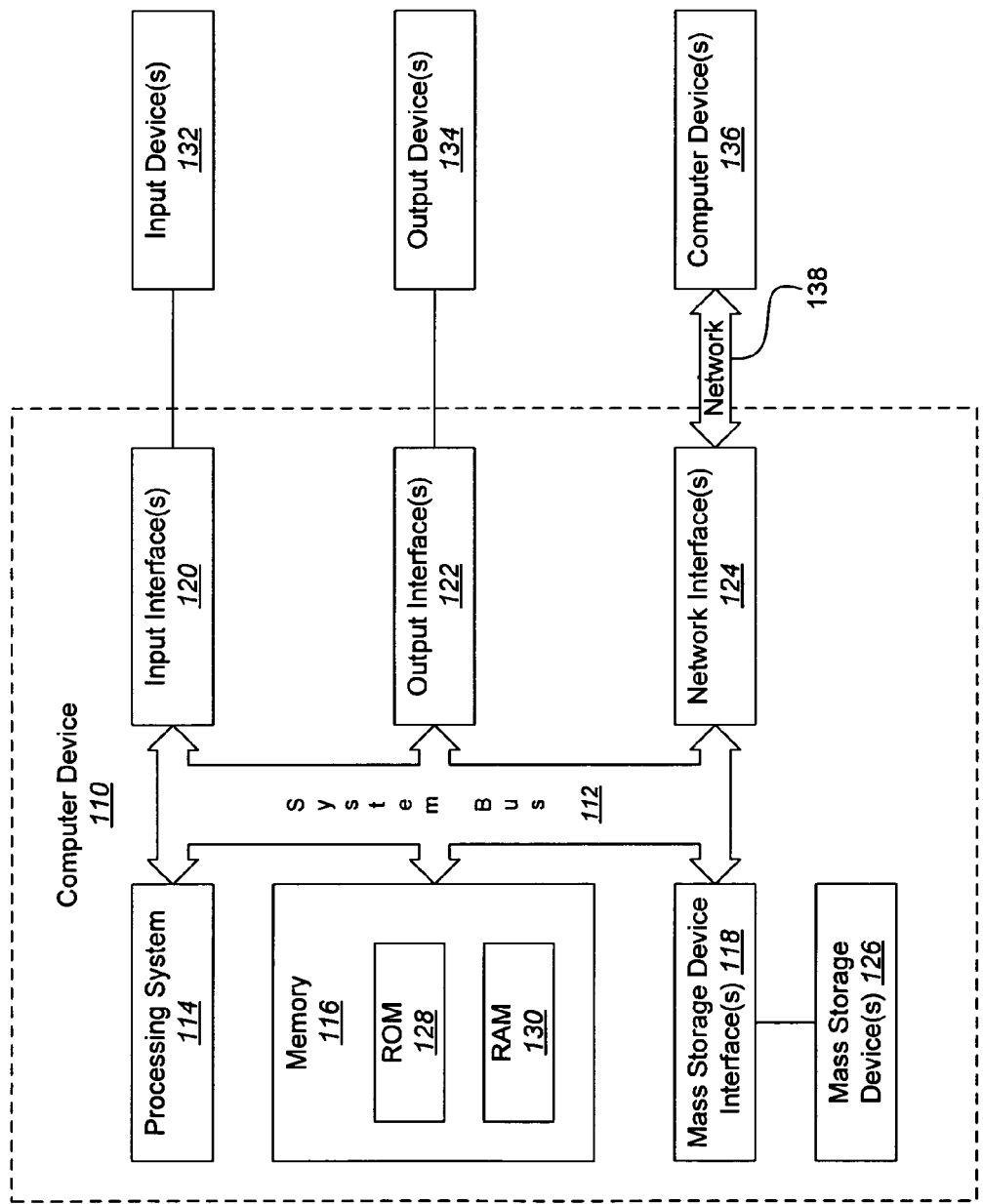
FIG. 2 illustrates an exemplary computer apparatus that can be used in some embodiments in the systems for creating, accessing, and communicating content.
Figure 3:
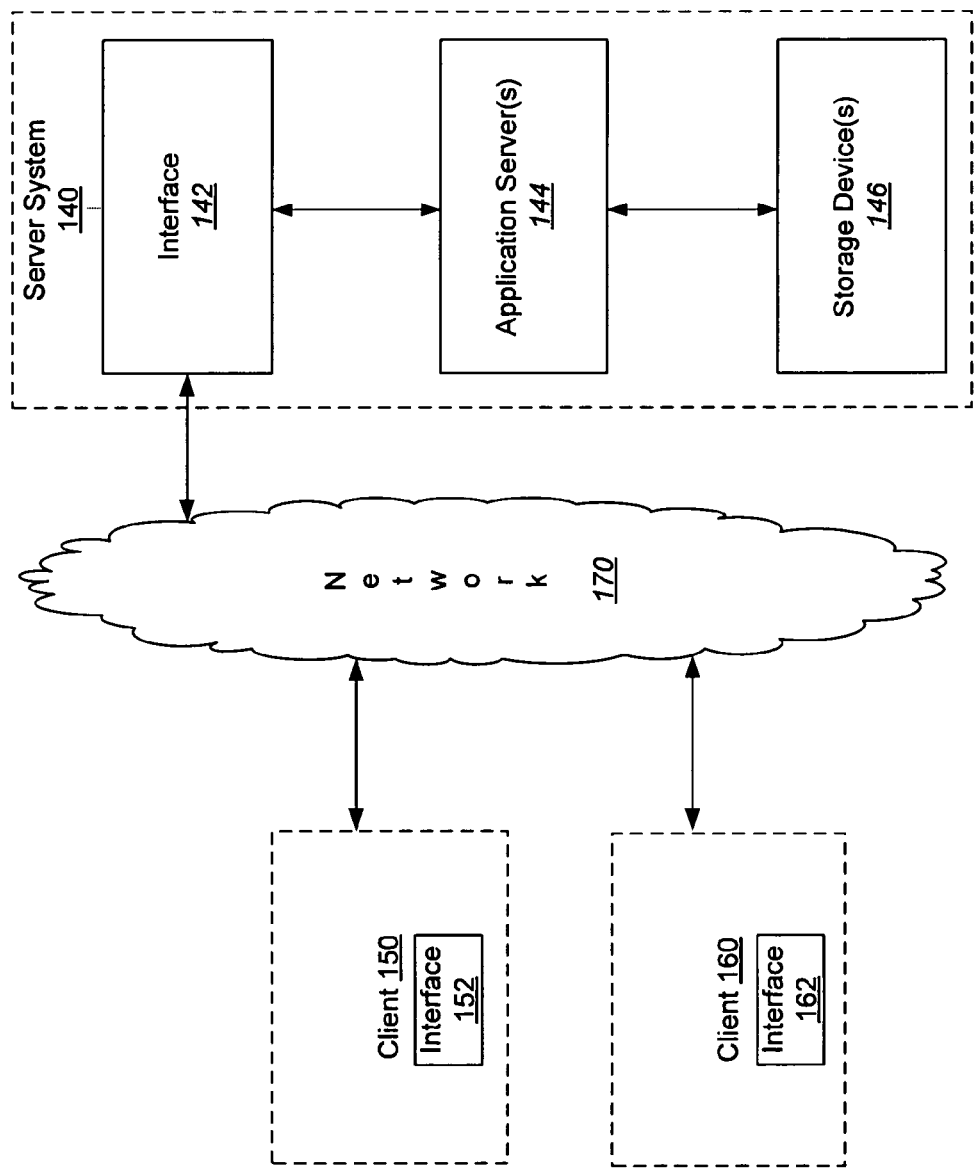
FIG. 3 illustrates an exemplary network that can be used in some embodiments in the systems for creating, accessing, and communicating content.

In some embodiments, FIGS. 2-3 illustrate one computer operating environment in which the system may be implemented. These embodiments contain one or more computer readable media that may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 2, the system includes computer device 110, which may be a general-purpose or special-purpose computer. For example, computer device 110 may be a personal computer, a notebook computer, a tablet computer, a personal digital assistant ("PDA"), smart phone, or other hand-held device, a workstation, a minicomputer, a mainframe, a supercomputer, a multi-processor system, a network computer, a processor-based consumer electronic device, or the like.

The computer device 110 includes system bus 112, which may be configured to connect various components thereof and enables data to be exchanged between two or more components. The system bus 112 may include one of a variety of bus structures including a memory bus or memory controller, a peripheral bus, or a local bus that uses any of a variety of bus architectures. Typical components connected by system bus 112 include processing system 114 and memory 116. Other components may include one or more mass storage device interfaces 118, input interfaces 120, output interfaces 122, and/or network interfaces 124.

The processing system 114 includes one or more processors, such as a central processor and optionally one or more other processors designed to perform a particular function or task. It is typically processing system 114 that executes the instructions provided on computer readable media, such as on memory 116, a magnetic hard disk, a removable magnetic disk, a magnetic cassette, an optical disk, or from a communication connection, which may also be viewed as a computer readable medium.

The memory 116 includes one or more computer readable media that may be configured to include or includes thereon data or instructions for manipulating data, and may be accessed by processing system 114 through system bus 112. The memory 116 may include, for example, ROM 128, used to permanently store information, and/or RAM 130, used to temporarily store information. ROM 128 may include a basic input/output system ("BIOS") having one or more routines that are used to establish communication, such as during start-up of computer device 110. RAM 130 may include one or more program modules, such as one or more operating systems, application programs, and/or program data.

One or more mass storage device interfaces 118 may be used to connect one or more mass storage devices 126 to system bus 112. The mass storage devices 126 may be incorporated into or may be peripheral to computer device 110 and allow computer device 110 to retain large amounts of data. Optionally, one or more of the mass storage devices 126 may be removable from computer device 110. Examples of mass storage devices include hard disk drives, magnetic disk drives, tape drives and optical disk drives. A mass storage device 126 may read from and/or write to a magnetic hard disk, a removable magnetic disk, a magnetic cassette, an optical disk, or another computer readable medium. Mass storage devices 126 and their corresponding computer readable media provide nonvolatile storage of data and/or executable instructions that may include one or more program modules such as an operating system, one or more application programs, other program modules, or program data.

One or more input interfaces 120 may be employed to enable a user to enter data and/or instructions to computer device 110 through one or more corresponding input devices 132. Examples of such input devices include a microphone, a joystick, a game pad, a satellite dish, a scanner, a camcorder, a digital camera, a tactile input device, and the like. Some examples of tactile input devices can include a keyboard and alternate input devices, such as a mouse, trackball, light pen, stylus, touchpad, touch-screen, or any other suitable pointing device. Similarly, examples of input interfaces 120 that may be used to connect the input devices 132 to the system bus 112 include a serial port, a parallel port, a game port, a universal serial bus ("USB"), a firewire (IEEE 1394), or another interface such as data that can be entered via a phone using a voice.

One or more output interfaces 122 may be employed to connect one or more corresponding output devices 134 to system bus 112. Examples of output devices include a speaker, a printer, a visually perceptible output device (e.g., a monitor, display screen, or any other suitable visualization device), and the like. A particular output device 134 may be integrated with or peripheral to computer device 110. Examples of output interfaces include a video adapter, an audio adapter, a parallel port, and the like.

One or more network interfaces 124 enable computer device 110 to exchange information with one or more other local or remote computer devices, illustrated as computer devices 136, via a network 138 that may include hardwired and/or wireless links. Examples of network interfaces include a network adapter for connection to a local area network ("LAN") or a modem, wireless link, or other adapter for connection to a wide area network ("WAN"), such as the Internet, or phone/cellular network for instance 3G. The network interface 124 may be incorporated with or peripheral to computer device 110. In a networked system, accessible program modules or portions thereof may be stored in a remote memory storage device. Furthermore, in a networked system computer device 110 may participate in a distributed computing environment, where functions or tasks are performed by a plurality of networked computer devices.

The system may be operated in networked computing environments with many types of computer system configurations. FIG. 52 represents some embodiments of a networked environment that includes clients 150 and 160 connected to a server system 140 via a network 170. While FIG. 3 illustrates an embodiment that includes two clients connected to the network, alternative embodiments include one client connected to a network or many clients connected to a network. Moreover, some embodiments also include a multitude of clients throughout the world connected to an electronic network, where the network can be a wide area network, such as the Internet.

Returning to FIG. 1, the user devices 15 comprise any communication device known in the art. In some embodiments, the user devices 15 comprise a desktop computer, a laptop computer, a server computer (for instance after running diagnostics and reporting results to a system admin, if the admin gives the command with proper authentication, we can restart the server), a telephone, a cellular phone, an automated calling system, any known interactive voice response (IVR) device, any known computer software or API (for instance, we can integrate with software to turn off a home's lights), an answering machine, mobile hand held devices, or combinations thereof. In other embodiments, the user devices 15 comprise a telephone or an IVR device.

The network 25 comprises any electronic communication network known in the art that, in certain configurations, is capable of using the communication employed by the user device(s) 15. In some embodiments, the communication network 25 comprises a wide area network, a local area network, telephone/cellular network, or combinations thereof.

The types of communication channels in the network include any of those known in the art. These communication channels include any phone communication (including interactive phone communication through speech or touchtone recognition, IVR, or text-to-speech playback), email, text messaging, SMS, or instant messaging (IM), internet communication such as through a web interface), voice mail, video communication (i.e., video conferencing or Skype conference) or any communication that connects/transfers people to talk to each other.

The platform 10 comprises the ability to coordinate the sending and receiving of data, trigger interactive outbound calls/chat messages/emails/SMS messages/API integration/ etc. that can be coordinated with the reception of inbound telephone calls, chat messages, emails, SMS, API integration, etc. Also, the platform can generate alerts and notifications, and reports, prepare user-configurable status or dynamic applications, speech recognition, touchtone recognition, speech-to-text generation, text-to-speech playback, xml, web pages, or any combination thereof. The platform 10 comprises any component or combination of components described above that provides any—or all—of these functions. In some configurations, the platform only uses a single or multiple functions at a time and those functions can—if desired—interact with each other. In other configurations, all of the functions are capable of working at the same time and interacting with each other. So, for example, if the platform was used to create an application that interacts with a user on a specific topic (i.e., "Did you feed the dog?"), that application can be simultaneously used in any or all of the following applications: outbound phone/voip, inbound phone/voip, outbound email/web, inbound email/web, outbound SMS, etc.

Thus, if a user receives a voice mail on this topic from the platform, the user can respond to the voice mail via the web or IM or email or whatever mechanism that works best for them.

One of the components that can be contained in the platform 10 includes a network browser 35. This browser can be used to view, organize, analyze, and utilize the information and data in the platform. In some configurations, the browser can control the software which an operator can use to control the operation of the platform 10. In some embodiments, the network browser 35 can comprise an HTML browser, an XML browser, a VXML browser, or combinations thereof.

Another component that can be contained in the platform 10 includes a server. Any type of server known in the art can be used. Examples of servers that can be used include a computer running a UNIX-style operating system, a computer running a Microsoft Windows operating system, Macintosh, or a personal computer workstation. The server can comprises any storage component on which digital information or content can be stored. Examples of storage components include optical storage discs, DVD-RAM discs, and traditional magnetic hard disc drives. In some configurations, the storage component could be a server in a network operations center (NOC).

Another example of a storage component includes any known database (or combination of databases). The database stores any desired information, including information regarding the digital content and any user interaction with the platform. For example, the database stores data regarding any specific user device(s). The database can also store sales information, user information, transactional information, reporting information, data warehousing, etc. As an example of the data warehousing, the platform can store any or all of the desired interactions (for instance, call recordings) as well as the static application used to contact/interact with the user during a transaction. The database may be a Microsoft SQL database, a Microsoft Access database, an Oracle database, a MySQL database or combinations thereof.

In some aspects, multiple servers may be connected together to make a server cluster. Using a server cluster permits sharing information regarding the content stored on each server and each transaction or event the server has recorded. By using a server cluster, the system 5 is always operational, regardless of the location of a particular component on the network that connects the components (such as the internet). The server cluster can contain a primary cluster, which handles all critical tasks, with minor functions being routed to a secondary cluster. With this configuration, if the primary cluster is not operational, most functions can be handled by the secondary cluster. A server cluster also allows for large-scale deployment and interoperability, as well as data that can be stored on the network in multiple points of co-location. In some configurations, there will be server redundancy as well as site redundancy for the servers.

The software components required for operating the server may be included on a single server or on multiple servers, with each server implementing one or more tasks and communicating among themselves using standard networking protocols. Non-limiting examples of the server-focused tasks using the software components that may be implemented on one or more servers including an e-mail server; network server; application server; conference server; ftp server; file server; user device server; speech/voice server, content management server; content synchronization server; chat server, reports server, SMS server; content security server; and advertising/promotional message server.

In some embodiments, such as those depicted in FIG. 1, the platform 10 can contain a network server 40. The network server 40 organizes and manages the data and information coming in from, and out to, the network 25.

In the embodiments depicted in FIG. 1, the platform 10 can also contain one or more application servers 45. The application server 45 manages the operation of the various software applications and/or paths/workflow that reside on the platform 10.

In the embodiments depicted in FIG. 1, the platform 10 can also contain one or more email servers 50. The email server 50 manages and organizes all of the email related information and data coming into and out of the platform 10 through any email communication method.

In the embodiments depicted in FIG. 1, the platform 10 can also contain a conference server 55. The conference server 55 manages the operation of any conference between an operator of the platform and any user (or combination of users) or any group of users.

In the embodiments depicted in FIG. 1, the platform 10 can also contain an FTP server 60. The ftp server 60 manages and organizes all of the information and data coming into and out of the platform 10 through a file transfer protocol (FTP) communication method.

In some configurations, the platform 10 can also contain a content database 65 that manages and stores digital content. The types of digital content that can be stored (and then delivered to a user) are virtually unlimited. Examples of the digital content include music, software, mobile phone ring tones, electronic books, advertising, and other types of content. The format in which the digital content is stored is also virtually unlimited. Examples of the types of digital formats include pdf, doc, xls, jpeg, tiff, gif, xbm, pnm, mpeg2, mpeg4, mp3, oma, m4a, wma, wmv, mov, wav, avi, xml, html, php, pl, jar, exe, alaw, vox, au, pcm8, pcm16, and vxml, as well as combinations thereof. The digital content can also be provided in any known language.

The digital content may be provided internally (by the entity that controls or operates the platform 10), or externally by one or more third parties that may be the copyright owners of the content or that act on behalf of the owners of the content, or even a user (collectively, content providers). In some instances, the digital content can contain instructions indicating how the content may be used, distributed, transmitted, or otherwise processed (use instructions). The server 10 can convert such use instructions into digital rights management (DRM) information that can be associated with any desired content. The DRM information may include any number or combination of restrictions, including those that are enabled by any known DRM technology.

The DRM information may be provided by a third party (such as content provider) or by the operator of the platform 10. Either may assign a unique transactional ID to each piece of digital content. This unique transactional ID correlates to a set of use instructions and DRM specifications to control how the associated content is managed on devices, such as on the server 40, as described herein. The digital content may therefore contain metadata (i.e. metatags), use instructions, and a transactional ID.

The metadata (i.e., metatags) can correspond to information about any desired content. The metatags may be provided by the content provider or created by the operator of the platform. The metatags may indicate the use instructions for all content that is provided, with distinct use instructions for each piece of content, or with use instructions based on parameters that can be used to classify content. The digital content may optionally be encrypted in a manner to increase security of the content during storage on the platform 10 or during transfer to and/or form the platform 10. Examples of such encryptions include both symmetrical and asymmetrical encryption using a variety of methods, including RSA, DES, Triple DES, AES, Blowfish, ElGamal, RC4, and others.

The content database can insert the content into any desired communication. For example, the content database could insert a text file into a phone call or could insert an audio file into an email, SMS, chat, API, or text message. In some embodiments, the content is inserted into the desired communication based on one or more characteristics that match the communication. For example, text from an excel spreadsheet can be inserted into an outbound call, thereby customizing the information spoken to the user. For example, an outbound call can containing the statement "Hello, this is Dr. Smith's office. [John Doe] has an appointment on [Monday, January 15$^{th}$] at [3:30 pm]." In this case, the various values within the brackets [ ] are taken from an excel spreadsheet and then inserted into the phone/voice application. In some configurations, the content database can contain a rules engine 90 which matches the content with the communication based on these characteristics. For example, if a specific user prefers email when interacting with the platform, when it's time to contact that user, the rules engine will determine that it could send them an email instead of calling them. Thus, the platform contains a way for users to input their personal information as well as preferred communication mechanisms. This personalization can be configured by time, event, or over-ride values.

In some embodiments, the platform 10 also contains a voice platform and/or speech engine 70, as shown in FIG. 1. The speech engine 70 operates both as a speech recognition engine which can automatically convert speech into text, as well as an automated speech generation engine which can automatically convert text into speech. Thus, the speech engine 70 can accepts voice and dtmf (button presses) as input and navigate the voice options accordingly.

The platform 10 can also contain a mining (or reporting) engine 75 as shown in FIG. 1. The mining engine operates to analyze the data present in—or flowing through—the platform 10. The analyzed data can then be used for many purposes, including optimizing the operation of the platform 10, customer specific reports, setting rules for the data/information that would trigger an alert or a notification, recipient engagement/progress results, or a combination thereof.

The platform 10 can also contain a monitoring engine 80. The monitoring engine 80 operates to monitor the operation of the various components of the platform 10. The monitoring engine therefore contains API's for data integration. integration and data services (web services, RSS, email, XML, API, FTP), with integrated triggering services for initiating any outbound communication via phone, job manager, reporting/statistics/logging service, billing and accounting service, multi-tenancy manager, user account (profile) manager which allows for user profiles to be established defining the various ways an individual may be contacted based on preferred device and based on time of day or day of week, resource and configuration manager, and scheduling service manager.

In some embodiments, the monitoring engine 80 allows any information or data associated with any user, and/or that user's activities ("user data") to be observed by and/or communicated to other parts of the platform, others users, and/or third parties. User data, among other things, may comprise of information about the user. For instance, user ID, password, and phone number for purposes of connecting various users together. It can also store the user's respective role for things like feature or report accessibility. It can also store preferred contact mechanisms. For example, for general public users, you can set up a preference such as, if a call is coming in from the CallerID associated with a specific person (MOM), send it to my cell phone. Otherwise, send it to voice mail. Another example is if a call comes in prior to 5 pm, send it to my work phone or have it record a message and send that message to my email. Another example is, if an email is from my boss, call me immediately and read it in text to speech. This can allow users a control mechanism to handle their communications. As a further example, a user can have a cell phone that no one knows their number. They can also have a second number that they tell people and have forwarded to their original number. If they are getting too many calls and want to change their publicly known number, they can without changing their real cell phone number. Also, information associated to the operation of any given user device and information related to the entered and/or non-entered activities of users. Entered user activities may include, for instance, information the user inputs into the system, i.e., keystrokes, cursor movements, and the like. Additionally, non-entered user activities may include activities such as the user's body movements and expressions that the user does not input, but that can be captured or observed by the user's device.

A monitoring engine 80 may function in any manner that allows either an operator of the system or a third party to perform the desired monitoring. For example, a monitoring engine may gather and relay user data by running continuous built-in tests ("CBIT") and transparently monitoring without disabling a user device or ending software applications. In another example, the monitoring engine may gather information or allow a third party to monitor a user device by taking screen shots, interrogating the system and subsystems, and receiving information from sensors, the CPU, input and output devices, and/or the like. In yet another example, the monitoring engine can be used to monitor the health of the system, including for CPU utilization, low remaining disk space, low memory, etc. As described herein, this monitoring action can be integrated with other parts of the system to allow system administrators real time access to their systems.

The platform 10 can also contain a configuration engine 85 as shown in FIG. 1. The configuration engine allows the operator of the platform to design and develop software application templates, containing an application and a template. The configuration engine contains audit capabilities for storing "static" applications and recipient interactions. For example, with outbound phone call, the configuration engine can use a network of local (relative to the user) phone numbers and/or callerIDs in the communication protocol. As another example, the configuration engine has the ability for on-hold management which allows a user to be placed on hold until either an agent or the speech engine picks up, or a predefined limit (say 10 minutes) is incurred. Also, it can configure hours of operation for a particular user's agents.

The platform 10 can be connected to the network 25 through an interface 30 that allows the platform to interact with the various user devices and the different communication methods they use. The interface 30 accordingly comprises any known phone interface like Session Initiation Protocol (SIP), Simple Object Access Protocol (SOAP), Skype, and VOIP. The interface also contains an email interface (like Microsoft Exchange or SendMail), an IM interface (like Skype, Yahoo Instant Messenger, Twitter, Jabber), and web interfaces like a "screen pop."

With such components, the platform 10 can be used to receive data (including content) and information from the user device via the network server, conference server, ftp server, and/or the email server. As well, the platform 10 can send data and information to the user devices via the web server, ftp server, network server, and/or the email server. As well, the platform can send or receive data by mechanisms like API Integration and voice mechanisms like phones, VOIP, and answering machines.

When the data is present on the platform 10, it can analyzed and used for a variety of purposes. First, the platform can decide (based on application paths, rules and configuration parameters which path/workflow to follow. Second, the platform can combine files located on the application server to come up with new data to analyze.

Third, the platform 10 can receive or initiate phone calls (or other communication to a user device) where a speech application template may determine which audio or video content files are played (if any), which text is rendered via the speech engine, and optional caller responses are recognized using the text engine. Call flow logic will then dictate the resulting actions based on the input from the operator and/or user. Responses may also be collected via email, text message, web portal or IM, using respective application services to receive, understand, and process such responses. The phone based responses from the user can be interpreted using DTMF or speech-recognition technology well-known in the industry, such as provided by vendors that include Nuance, IBM, or Microsoft, among others. Any DTMF or speech grammars can be associated with the application in order to assist in collecting responses.

In some embodiments, the platform 10 can provide substantial real-time interactivity with any number of users. To obtain this real-time interactivity, all responses for instance voice, DTMF, instant message, SMS, email may be configured within the application on the application server to obtain information from the user (whether recipient or caller). For example, the platform could be used to collect any user input such as associated with authentication, authorization, or confirmation of receiving information.

In some configurations, the platform 10 has the ability for transferring the communication from a given user's device to another user's device. In these configurations, certain application logic may include the ability—and dictate that—a call be transferred from one phone number to another number. For example, if a pending transaction is not authorized by the account owner using a given user device, logic may be applied by the application server 45 to transfer the owner to a customer service agent who can further assist with the call. Alternatively, where multiple users may be required to authorize a transaction, it may be obtained by making several successive or parallel calls to one or more individuals for authorization.

In some embodiments, the platform 10 can be configured for data integration. In these embodiments, the platform can trigger a multitude of actions. Examples include an outbound call, where information regarding the account information or transaction is submitted to a web-telephony platform via web interface, database calls via API, direct integration with $3^{rd}$ party or customer systems, or formatted email. Information dynamically submitted is combined with predefined text or recorded prompts and then can be presented to the account owner in a seamless fashion. In some instances, data or other submitted content can be combined with pre-recorded prompts and/or text rendered to text by the speech engine, within the context of an interactive speech application, to deliver said data or content over the telephone. Similarly, data or content can be combined with other digital components like text or other files like pictures to be sent to users or systems.

The platform can be capable of identifying the desired content/data, assembling the data and content into a specified format, and submitting said formatted data to, for example, a directory folder or database or temporarily held in memory as data is encrypted and then passed to other customer systems. The data can be submitted to—and received by the platform 10—either statically or dynamically. The data can be submitted in almost any form including, but not limited to email, ftp, XML API, or any other standards-based formats known in the art.

When new data is submitted to the platform, it can take any number of actions. Examples include but are not limited to triggering a process for assembling that data into specified locations in an application template on the application server and/or with the user or rules engines. Another example is the platform can generate an outbound call or instant message or screen pop or sms message or email, etc where the specified data (along with optionally associated audio or text files) are presented. Another example is the data in the outbound call can be compiled into a single audio file for subsequent playback using a personal computer or other media device.

The platform can optionally be customized for the users. In some embodiments, the platform can be customized to create an application template that is specific to the needs of that user (or group of users). The template(s) can be created using the configuration engine 85. The applications may be created in one or more of the following methods. First, by entering text, such as through a web interface, and then the entered text can be played over the phone using the speech engine. Second, the applications can be by submitting content via email, ftp, or other API method. For example, the submitted content may comprise pre-recorded content (audio files, advertisements) or existing text content (such as from email services, news services, RSS feeds, etc.). Third, an application can be created by recording prompts and/or questions through a web interface or over the phone. Recording desired content over the phone can involve either an inbound or an outbound process. In an inbound process, an individual user can call into a specified phone number, subsequently record desired content over the phone, and optionally follow a series of prompts which guides the caller through the various parts of the template. In an outbound process, an individual user can enter a phone number, such as through a web interface. This action can then trigger a call back to the individual user who can then record the desired content over the phone, optionally followed by a series of prompts which guide the caller through the various parts of the template. Fourth, an application can be created by uploading prerecorded content that includes, for example, audio files, video files, etc.

The platform therefore enables individuals (both users and operators of the platform) to easily incorporate interactive elements to collect feedback from those who are contacted. Specifically, the platform allows the users to leverage interactive templates with the ability to select from predefined templates and/or create new templates with associated speech recognition grammars if desired.

In some embodiments, the platform can leverage the phone and all other mechanisms in a one-to-many approach to communicate information, especially time-sensitive information. In these embodiments, the information that is to be conveyed can be created and then stored in the content database. The information can be either pre-recorded speech or text. Then, the information can be relayed to multiple users at the same time over the phone by playing the pre-recorded speech or by using the speech engine to convert the text to speech. Such embodiments can be useful for the same information (such as delinquent payment information) that needs to be relayed repetitively to individual users (such as those that are delinquent in their payments). Conversely, it can be a many to one. For example, in the one to many communication, an email campaign can be sent and asking for responses to an invitation for a certain even. The numerous responses can come into the platform via a single inbound phone number.

In some configurations of the platform, all of the mechanisms and functions interact with each other. So, as an example, if the operator of the platform made an application that asks the question "Did you feed the dog?" it can be simultaneously used in any or all of the following applications: outbound phone/voip, inbound phone/voip, outbound email/web, inbound email/web, outbound SMS, etc. The advantage of this configuration is that if a user receives a voice mail, they can respond via the web or IM or phone or whatever mechanism that works best for them. Thus, the user is not limited to that communication channel by which he/she was contacted by.

Figure 4:
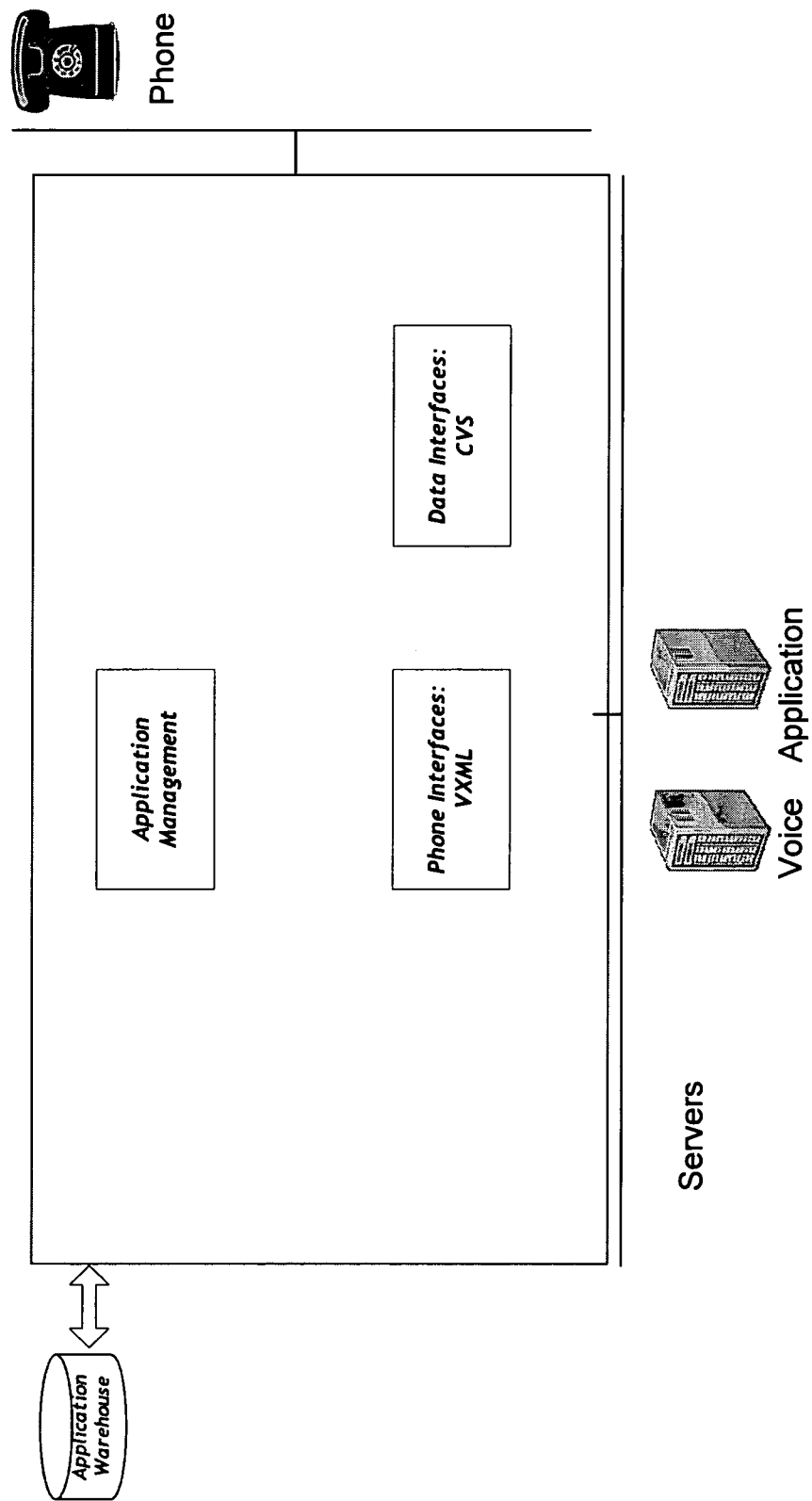
FIG. 4 depicts some embodiments of the systems of creating, accessing, and communicating content with minimal involvement by a user.
Figure 5:
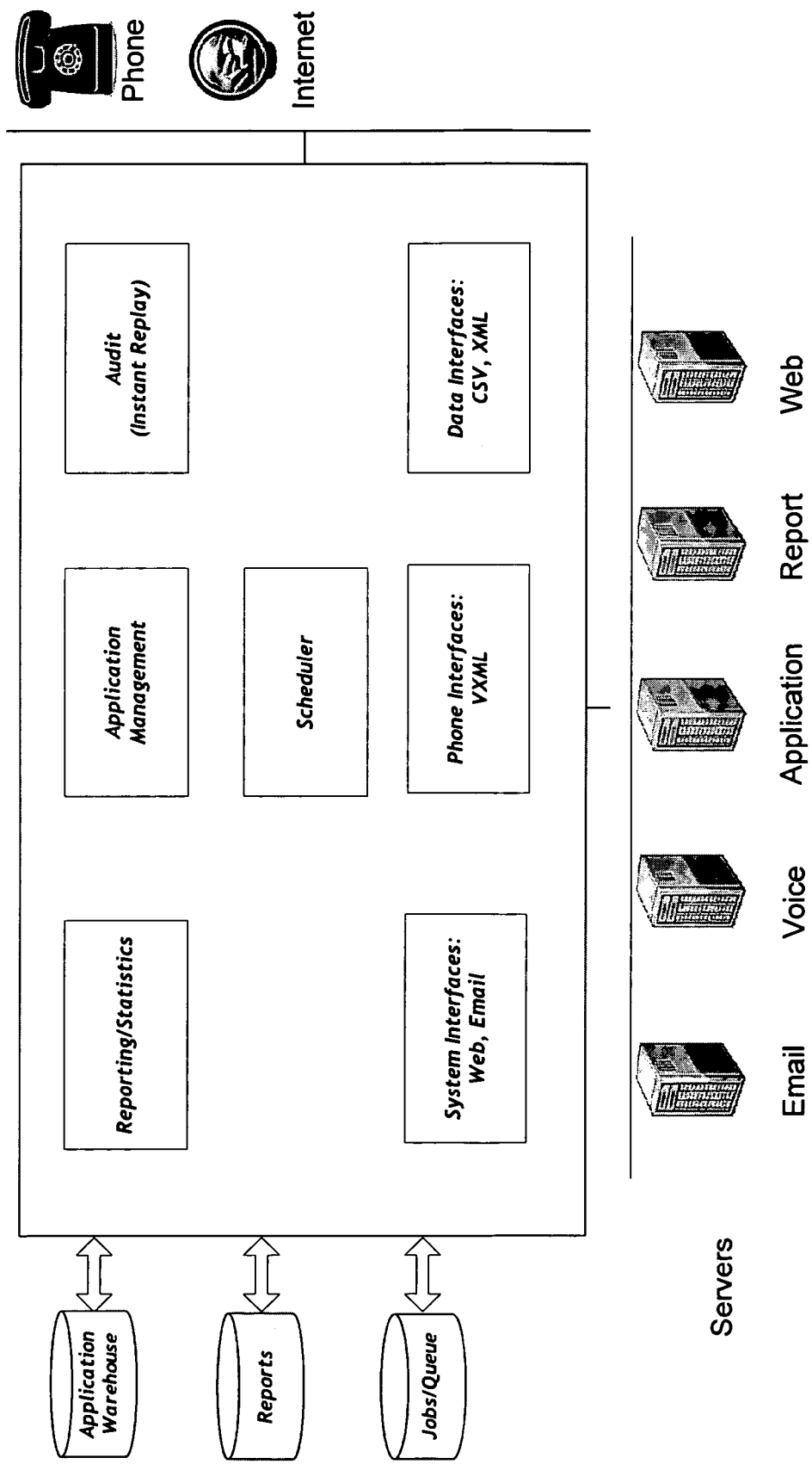
FIG. 5 depicts some embodiments of the systems of creating, accessing, and communicating content with increased involvement by a user.
Figure 6:
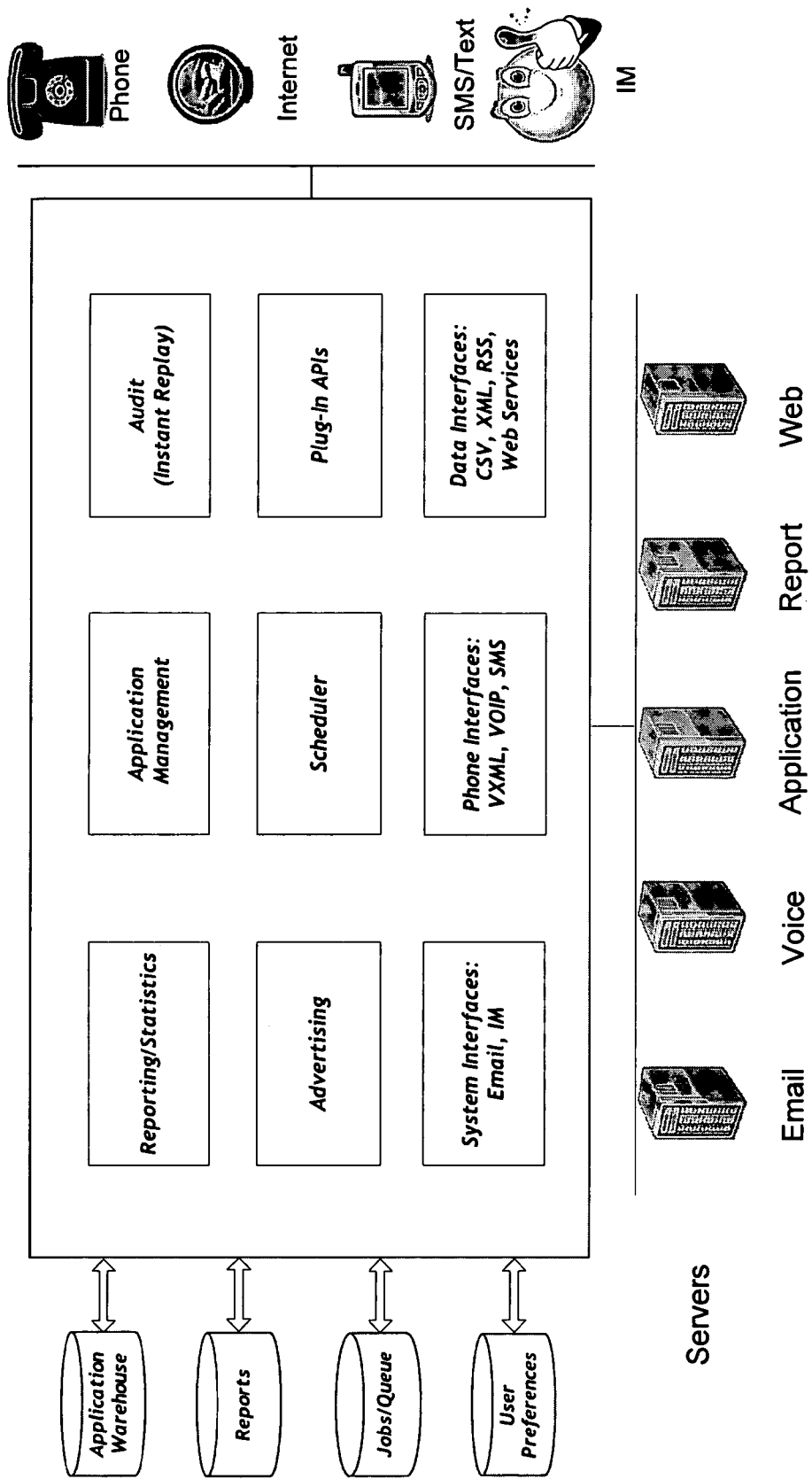
FIG. 6 depicts some embodiments of the systems of creating, accessing, and communicating content with even more increased involvement by a user.

The platform can be customized for different categories of users. In some embodiments, the system can be configured as shown in FIG. 4 for minimal involvement by the user. In these embodiments, the platform has been configured to be operated as a managed service for the user so minimal components (and associated functions) of the platform are present. In other embodiments, the system can be configured as shown in FIG. 5 for more involvement by the user relative to the configuration FIG. 4. In the embodiments shown in FIG. 5, the platform has been configured to be operated as a semi-managed service for the user so that a moderate amount of the components (and associated functions) of the platform 10 are present. In yet other embodiments, the system can be configured as shown in FIG. 6 for maximum involvement by the user. In these embodiments, the platform has been configured to be operated as a self service for the user so the maximum number of components (and associated functions) of the platform are present.

The systems described above can be used to perform a variety of methods using the content. Some methods comprise creating data or content. The data/content can be created by the user and then submitted to the platform. As well, the data/content can be created by the platform and then communicated to the user. Further, the data can be created during the interaction between the user and the platform, and in certain instances, during the interaction between two users.

Some methods comprise submitting (or receiving) data or content to (or from) the platform for subsequent communication. In these methods, the data/content can be transferred to (or from) any user device or group of devices at once or one device at a time. The manner in which the digital content is transferred between user devices can be controlled by the network server. All aspects of the content transfers can be controlled, including controlling the times of day for transfers, the upload and download bandwidth of a user device, and the content available for transfer.

Figure 7:
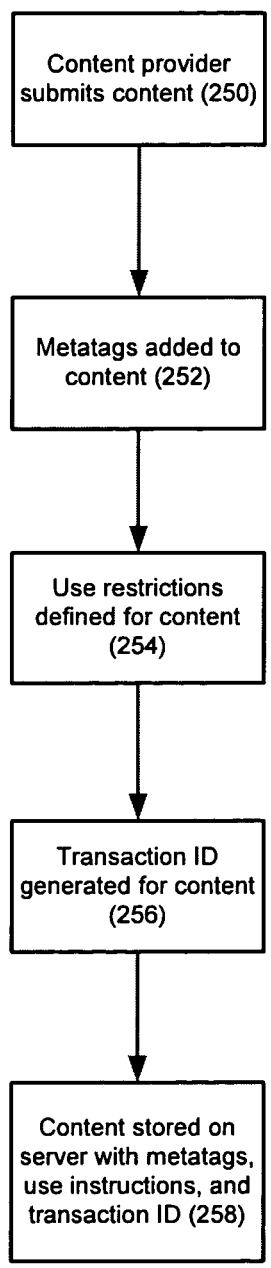
FIGS. 7-8 show some methods for creating, accessing, and communicating content.

One example of a method of transferring the digital content is partially illustrated in FIG. 7. In this Figure, the content can be provided by a content provider through the user device (as shown at box 250). If desired, metadata can then be added to the content (as shown at box 252) either by the content provider or the platform. Next, both use restriction(s) and a transaction ID(s) can be generated for the content either by the content provider or the platform, if needed (as shown at box 254 and 256). When they are used, the metadata, use restriction(s), and transaction ID(s) can be added to the content (as shown at 258) by the content provider or the platform.

Figure 8:
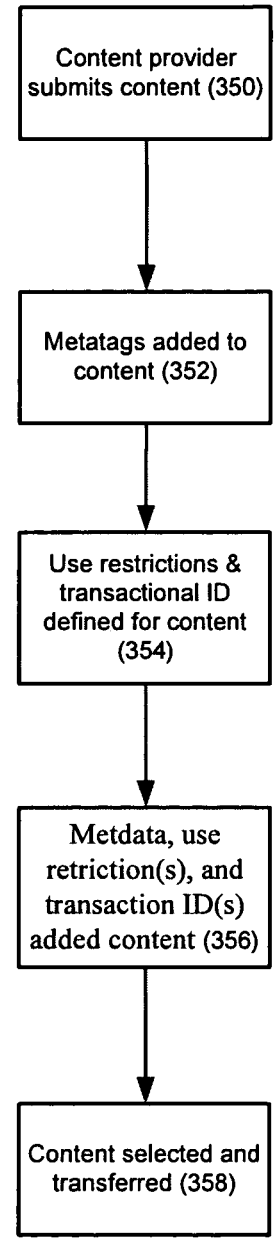

Another method of transferring the content comprises distributing the content to the user. For the system 5 illustrated in FIG. 1, the platform 10 can distribute the content to any desired user through the appropriate interface. One example of a method of transferring the digital content to the user is illustrated in FIG. 8. In this Figure, the content can be provided by the operator of the system through the content database 65 (as shown at box 350). If desired, metadata can then be added to the content (as shown at box 352). Next, both use restriction(s) and a transaction ID(s) can be generated for the content, if needed (as shown at box 354). When they are used, the metadata, use restriction(s), and transaction ID(s) can be added to the content (as shown at 356). The content can be selected and then be transferred to the user's device (as shown at box 358).

The user's device 15 can include any portable electronic device operated by the user that is capable of storing and/or using the content. In some aspects, the portable electronic device comprises a portable storage device or portable viewer/player. The portable storage device may comprise a USB-based solid state storage device, such as a flash-drive, thumb-drive, keychain drive, or similar device; or other portable storage devices, including Compact Flash cards, Secure Digital cards, Memory Stick cards, or other similar technologies. A portable storage device may also comprise magnetic or optical storage technologies as known in the art, including CDs and DVDs. The portable viewer/player may comprise a portable music player (such as an iPod or similar player) or a portable electronic document viewing device (such as an e-book reader), a mobile or cellular telephone, a personal digital assistant (such as a Palm Pilot, iPaq, Blackberry device), or similar devices using any technology, operating system, or configuration known in the art. The transfer to the user's device can be made using any technologies known in the art. These technologies include wireless transfers (i.e., Blootooth, Wi-Fi, Wi-Max, etc.), network transfers via any protocol, and bus transfers between devices attached to the same computer processing unit via connectivity such as USB port, FireWire IEEE-1394, serial port, parallel port, PCM-CIA, CompactFlash, SecureDigital, or like ports or means of electronic connectivity. After the requested content has been transferred to the user's device, the user may use the content as he or she chooses, within the limits of the restrictions that were part of the content transferred.

In addition to transferring digital content to the remote device, the system can be used to collect data from the user's device. Any data or information can be transferred from the user's device to the platform. The collected data can also include financial data. Examples of the types of financial data include payment information, sales information, credit/debit/gift card information, promotional/discount codes, accounting information, other electronic payment information (for instance PayPal) and so forth. As a user's device can be a system, any type of data can be collected (as long as the appropriate mechanisms and authentication are provided). For instance, for claims collection, the platform can gather information about the status of a claim from the insurance company's system. Examples of other types of data include checking account information and demographic data. The data can be transferred on a periodic basis, on a semi-dynamic basis, or on a real-time basis. Because perfect real-time basis may not be available due to data transmission speeds, the transfer can be on a near (or substantial) real-time basis. In other words, due to the delay caused by data transmission, processing, and analysis, real-time communications are often referred to in the art as near real-time, though they are often used interchangeably. In some aspects, the data is transferred as close to a real-time basis as allowed under the operating conditions then existing because this allows for the immediate aggregation and dissemination of data from the platform.

The collected data may be communicated to or monitored by other users (third parties) using a variety of techniques. In one technique, the entity controlling the server actively communicates to third parties using, for example, e-mail, EDI, DEX/UCS, or by uploading the data to a separate computer controlled by the third party. In a second technique, the third party is provided with access to the server on which data is stored, or another server controlled by the same or an affiliated entity. This technique permits the third party to access and monitor the data, including analyses and reports, in real-time or at times determined by the other third party. One example of a communication method by which a third party may access and monitor the data on such a server is via a web portal interface of the platform. This web portal is provided to users based on login location, authentication information provided, and other criteria as is standard in the art. Other examples of communication methods by which a third party may monitor, receive reports concerning, or otherwise access the collected data are automatic facsimiles, phone calls, pages, instant messages sent by means such as Google Talk, Skype, or Windows Messenger, or reports delivered by the system when the third party calls.

The collected data can be reported to or monitored by the third parties by either transmitting it to the third parties or by allowing the third parties to access the platform either directly or indirectly through the web portal. In the former situation, the collected data may be optionally collated, analyzed, summarized, or otherwise processed using a variety of steps. This situation allows the operator of the system to perform the analysis, filter the results, and/or customize the report that is sent to the third party. In the latter situation, the third party can monitor the collected data before (or as) it is received from the user devices or anytime during the analysis, filtering, or customization process. Of course, access to the platform by the third party can be established using any parameters desired by the operator of the system, i.e., access to only certain portions of the collected data.

Alternatively, the collected data need not be transmitted to the platform before being monitored by or reported to third parties. In these aspects of the systems, the data can be monitored by transmitting it to the third parties from the user device(s). This situation gives the third party more access to the raw data that has been collected, but does not necessarily allow the operator of the system to analyze, filter, or customize the report. Of course, access by the third party can be established using any parameters desired by the operator of the system, i.e., access to only certain portions of the collected data.

All of this collected data from the user device(s) can be used for numerous purposes. In some aspects, the various types of collected data may be used to improve customer relationship management, as known in the art, and thereby maintain and create lasting relationships with users. The ability to monitor user transactions allows determination of common trouble spots in the user interaction with the system, including interactions with the platform or components thereof. With this information, the system can remove or change the trouble spots and make the system and platform more user friendly. Also, by receiving and being able to monitor large amounts of detailed feedback from earlier analysis, the system may be better equipped to make decisions that reflect the wants and needs of users.

In other aspects, the collected data can be part of the general and specific market research data that can be used by the system as known in the art. With the market research data, the system can monitor, access, and immediately analyze user trends. These trends can even be narrowed down to the trends of specific users. For example, the system could use stored user personal details and activities to create predictive modeling of the user's attributes and future activities.

In some aspects, the collected data can be used to enhance and/or customize the operation of the system and/or the platform. For example, a system administrator could monitor fault and performance data to identify factors that slow transactions or communication. In other aspects, the collected data can be used to enhance the transfer of the content. In yet other aspects the collected data could be used to assess areas of improvement for user's own processes. For instance, for claims collection, the platform will be able to determine things like which types of claims come in and which agents resolve the claims in what time frames (and assessing possible areas of training). Another example in claims collection is length of resolution times for providers. In this case, if a provider is consistently way above expected time frames, training or other action may result. Another example is to determine segments of individuals for web, email, SMS and voice campaigns.

In other embodiments, the collected data can be used to customize the advertising or other notifications. In these embodiments, the customized advertising can be better targeted for user needs and desires and allow for advertising to broad general audiences or even niche markets and individual users. The advertising may include messages used to market, promote, or sell products or services or to enhance brand recognition, as well as training materials, entertainment content, community or location information, and other similar materials. In other aspects, the advertising may include video clips, audio clips, ring tones, coupons, promotional codes, images, giveaways, discounts associated with digital content or other promotional or brand-related content. In some embodiments, advertising may be presented through video and/or audio presentations, animated PowerPoint presentations, flash programs, banners, pop-ups, screen-savers, wallpapers, posters, digital sampling, cost-per-pixel, cost-per-click, advertisement images, printed advertisements, trademarks, coupons, and other similar advertisements. Other notifications could include messages like "The Open Enrollment deadline is January $1^{st}$."

In some aspects, the advertising can be bundled with the content. In these aspects, the advertising is incorporated with or delivered along with the content to the user in a digital or electronic format. One example of these aspects includes advertisements that are delivered with the content so that when a user accesses the content, the advertising is automatically displayed before or after the content. Another example includes advertisements that are delivered with the content so that the user can optionally choose to view the advertisement when the content is accessed. In other aspects, the advertising is separate from the content. In these aspects, the advertising can still be delivered to the user, but is not incorporated (or bundled) with the content.

In some embodiments, the methods can be used to advertise directly to the users in the system or send other information like reminders or notifications. In these embodiments, the method supports the dynamic insertion of text, audio, or video content, which can include any desired advertisement or message, e.g., any content produced with the intent to inform, encourage, sell, or position information to defined market segments. In other embodiments, the system can provide interactive multi-media advertising and can perform the following functions. First, the system can receive multi-media advertising or other content, including voice, email, web banners, video and combinations thereof. Second, the system can track advertising and/or market segment and profile-based information, geographical information (including area or zip codes), segment profiles such as gender, age groups, and other psychographic profile information, interest in specific products and/or services, or combinations thereof. Third, the system can target market selection which, when based on the advertising/marketing information listed above, users will be able to choose markets and/or sub-markets to target with relevant advertisements. The advertisement can be delivered in one or more media channels (e.g., phone, email, web interface, etc.) to the intended user, allowing for greater effectiveness of the advertising campaign. And the advertising can be configured with interactive options that will allow user choices; e.g., " . . . to hear more about option A, press 1; for option B, press 2, etc."

The billing for any or all parts of the system including the advertising can be integrated and can be based on one or more of the following factors: the number of times the content is accessed; the degree of match to the user segment profile; the number of time users selected to receive more information and/or be transferred to the associated advertising site; and/or the amount of time spent in the system, the amount of results attained. For instance, price A for getting the user to the first checkpoint in the application, price B for the next checkpoint, etc. Also, for successful end results, a contingency based on collection amounts could be assessed. The system can report delivery and response/success rates, the number of times the content or advertisement was presented, the number of times a user opted in to hear more, successful collections, and/or customer opt-ins, etc.

Other methods allow the operator of the platform to configure and customize information presented to a user. In some embodiments, the platform can be used to analyze or manipulate the information for any number of purposes. When the content is transferred from the platform to the user device, the operator of a platform 10 may customize which content (or category, group of content, or advertising) is transferred, as well as customize which content is transferred from a particular server to a particular user device (or to a collection of user devices). As well, the content can be customized before it is distributed to a user. Some examples of the content selection parameters include a reduction rate in debt owed. For example, if a customer wants to offer a 25% reduction on balances between $1,000 and $2,000 as well as a 50% reduction in balances over $5,000. These revised balances can be automatically calculated and presented to the end user.

Other methods of using the platform allows user (or even a third party) to create or configure an application, and/or submit data related to said application. These methods can be used in some instances for the purpose of alerting and notifying account owners of account activity. In these methods, the user can use the configuration engine to create, modify, and/or customize an application that is specific to them and their needs. For example, a bank could create/customize an application which dictates when and how the customers of the bank are notified of overdrawn accounts.

In some embodiments, the transfer of content includes certain notification actions, including actions that are taken on a proactive basis. The need for this type of communication revolves around the need to proactively notify account owners of events that may require action, such as authorizing pending transactions, transferring funds from one account to another, making a payment, etc. The following account events could trigger notification: account balance thresholds; transaction verification of pending or completed transactions, especially those that may exceed a given amount; password change/reset; credit card transaction; account upgrade changes; complaints; payment failure; negative balance/overdraft; other events related to financial account activity; fund transfers; balances coming due; or any combination thereof. The action can be used to notify individuals of information, such as account information other events, including—but not limited to—pending or completed transactions, balances, and available funds, appointment reminders, medication reminders, severe weather notices, school closures, a change in game/practice schedule, etc. Notification may be conducted via phone calls, text messaging, instant messaging, email, APIs to other systems or any other communication method described herein. In some embodiments, the communications methods can be used to proactively notify users of account information and events, comprising pending or completed transactions, balances, and available funds, whereby said notification may occur via phone calls, text messaging, or email. For example, where a specific user has an overdue account, the platform could be used to proactively notify the user of the interest that has been charged on that account in the previous month.

The notification actions, including the method for initiating an outbound call or other mechanism, may comprise the process of monitoring a file directory/folder or other triggering mechanism such as incoming API activity, database activity, etc. Upon detection of a change in the file(s) or other mechanisms submitted via ftp, email, or XML API or other standard interfaces, the process of assembling said new file(s) with other predefined content can be triggered. The process continues by initiating a phone call (or other communication) to one or more recipients, and playing (or otherwise accessing) said predefined content and new files in a defined order. For example, the notification action can be used to contact an account owner to authorize a pending transaction, whereby a request for funds or information from an account automatically triggers an outbound call, presenting transaction details, and giving a recipient an opportunity to authorize said transaction, wherein multi-factor authentication that may incorporate voice or DTMF interaction is used to authorize said transaction. In another example, the method can be used to authorize a pending transaction, whereby a request for funds or information from an account automatically triggers an outbound communication (e.g., phone call, IM, email, or text message), presenting account status and/or transaction details, and giving a recipient an opportunity to authorize said transaction, wherein multi-factor authentication that may incorporate voice or DTMF interaction is used to authorize said transaction.

The notification action can be based on the profile of the user. In these embodiments, the platform includes the added component that the account owner can specify the preferred method(s) of contact, across phone, email, IM, text or other mechanism, and even by preferred time of contact by time of day or day of week. As well, the user could specify the type of data or information that could be received by any specific user device.

In any of these methods, the communication can be initiated by the account owner, by the account holder, or other entities, like the platform scheduler on behalf of the client. In these instances, since the communication (typically a phone call, but could also be an email, IM, text or other type of message) is initiated by the account holder to the phone number of record, it provides an initial level of authentication via mechanisms like user name and password. Furthermore, when the phone call is received, additional levels of authentication can be implemented that comprise one or more of the following: a prompt for a PIN number, to be entered using the touchtone keypad; a prompt for a spoken PIN number, which would be interpreted using speech recognition technology; a prompt for a spoken password, which would be interpreted using speech recognition technology; or a prompt for a spoken PIN or password, which would be recognized using speech recognition, and further evaluated for voice characteristics to be compared to a reference voiceprint in the account owner's profile. This method could be implemented using any practice, such as linking a voiceprint to a specific utterance (e.g., passphrase) or set of digits (either defined or random).

In some embodiments, the communication exchanged between the users can be used for data analytics. In these embodiments, the operator of the platform can analyze the data being exchanged through the platform or residing on the platform for any purpose, such as building data rich customer profiles or establishing right party contacts.

In one example of the systems and methods described, a transaction can be initiated to pay funds to a payee. In this example, a phone call can be triggered (whether manually by the operator of the system or automatically by the mining engine) to the account owner at a number specified in a profile associated with the specific account owner. When the phone call is picked up by the account owner, any of the following information could be presented through voice prompts or other mechanisms like screen shots or chat messages: an initial greeting; the source of the call (i.e., identify the account holder); the reason for the call (e.g., notification call regarding, e.g., account balance, pending transaction, etc.); an optional prompt for authentication, if desired, to confirm identity of the recipient including a PIN number; a password; a voiceprint (as tied to spoken phrase); an optional prompt for authorization of the pending transaction; an optional confirmation of authorization; a closing prompt; or combinations thereof.

Another example of the systems and methods described above includes an interactive process. First, certain context rules for triggering an alert are defined. For example, for online auction services, a user can define triggers such as when they might be outbid on an auction item, or when the end of the auction is nearing. After that, the user defines the preferred method(s) and mode(s) of contact. Then based on these context rules, the platform integrates with the auction house and uses its API/functionality to monitor and/or receive alerts based on the context rules. Next, upon meeting a rule, a trigger initiates a sequence of events whereby the platform 10 contacts the account owner via the elected method (such as a cell phone). Next, the current account and/or auction status information is provided to the account owner. For example, the current bid price and user's current max bid amounts can be provided. Then, the account owner is given an option to take any desired action, such as to increase the maximum bid. Next, the account owner may take that action (submit a new maximum bid) using either speech or touch-tone interactivity. For example, hot-keys or keywords may be set and used to expedite bid submission; e.g., press *1, *2, or *3 to automatically increase your bid to a corresponding amount set up by the bidder, such as through a web interface. Or explicit bids can also be submitted using touchtone or speech, such as by entering 1-2-3-4-#, to submit a bid amount of $12.34. Next, the platform confirms back the new action taken (the max bid price) to the account owner. Optionally, depending on the amount of time remaining in the auction, the account owner may be offered a choice to remain on the line to hear periodic updates on the bid price. Optionally, advertisements may be inserted into the call while the person waits for the next update. Optionally, the advertisement may include the capability to be transferred to another site after the auction ends, to obtain more information. This functionality can work in concert with the advertising rules engine and library to provide advertisements which meet the desired segment profile.

The systems and methods described above are different from conventional payment systems and methods in several ways. Some methods for authorizing a payment (or other financial transactions) typically involve 2-factor authentication using credit card or a debit card. These methods can be generalized into present transactions, where the account owner is physically present and not-present transactions, where the account owner is not physically present. In present transactions, a debit card and a PIN number or a credit card and a signature are used as the factors to authenticate the transaction. In not-present transactions, the credit card number and the expiration date (and optionally the security number on the back of the card) is uses as the factors to authenticate the transaction.

Another payment method is through a third-party payment services (e.g., PayPal, CheckFree, and other similar companies), whereby a member links bank account and/or credit card information to the proxy account, and uses the proxy account information to make payments, thereby avoiding the need to disclose the actual bank or credit card information directly to the payee. When making a payment, the payor uses the internet to log into, e.g., PayPal, using a login ID and password, enters the payee and amount information, and confirms the information to initiate the payment.

By definition, though, proxy payments fall into the category of not-present transactions. While this payment method is considered to be more secure than transactions where the actual card number and expiration date is provided directly to the payee, the potential security loophole exists if unauthorized persons are able to obtain the login ID and password for the proxy account. Such a situation not only allows fraudulent transactions to be initiated using the proxy account, but also allows the fraudulent person to view any other bank names or credit card companies which the account owner has linked to the proxy account. And given the nature of proxy account payments, the proxy account owner may not initially be aware of any security breach or transactions which may have occurred for even hours or days, allowing time for multiple transactions until the funds have been depleted or credit limits reached.

Using the platform described herein allow the insertion of an additional authentication step. For instance, calling or texting the account owner before a transaction is completed. In this instance, if a purchase was made and the payment mechanism chosen was PayPal, an outbound call could be placed by the platform to the owner asking for permission to process the payment. A unique question that the account owner created can be combined with a matching voiceprint that could be utilized for authentication. So, if the person making the purchase is the account owner, their phone would ring and they would be able to easily answer the question asked. If the person making the purchase is fraudulent, their phone wouldn't ring nor would they be able to easily answer the private authentication question while matching the real owner's voice print.

The systems and methods described above provide numerous advantages. First, they leverage the ubiquity of the telephone and other communication mechanisms since it provides one of the best methods for interactively communicating time-sensitive information. Second, they provide an opportunity for adding another layer of security to communication by allowing interactive response (e.g., PIN or password alone, or layered with voiceprint technology).

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

The invention claimed is:

1. A method of communication, comprising:
   providing a communications platform capable of coordinating multiple channels of communications with multiple users concurrently comprising:
      a browser for a communications network, the browser configured to interact with and organize information about the multiple communication channels and the multiple users;
      a server for handling communications between the platform and multiple user devices external to the platform and for inserting content into a communication between multiple users;
      a database for storing content, the content including financial data about a first user and financial data about a second user;
      a speech engine for converting text to speech, for converting speech to text, or both;
      a monitoring engine configured to store a preferred communication channel and contact mechanisms for a given user; and
      a configuration engine for customizing a communication application to a specific user;
   connecting a communications network to the communications platform;
   using the browser to provide an interface between the communication platform and the communications network, the interface configured for the platform to interact with various types of user devices and communication channels used by said devices;
   using the monitoring engine to monitor and store the preferred communication channel and contact mechanisms for a given user;
   using the configuration engine to customize the interface for a given user based on the preferred communication channel and contact mechanism;
   connecting a first user device and a second user device to the communications network;
   allowing the first and second users to communicate with the platform through the first and second user devices using their respective customized interfaces;
   using the database to collect data from the first user device and the second user device, the collected data including financial data about the first user and financial data about the second user;
   using the collected data to authenticate the communication between the first user and the second; and
   using the platform to report the results of the interaction between the first user and the second user.

2. The method of claim 1, further comprising allowing the first user to customize an application.

3. The method of claim 1, wherein the platform can communicate with the first user using a phone communication, VOIP, email, chat, text messaging, SMS, or instant messaging, internet communication, voice mail, answering machines, video communication, APIs, web pages, web services, or a combination thereof.

4. The method of claim 3, wherein the platform begins a first communication with the first user using a first communication method.

5. The method of claim 4, wherein the first user can respond to the first communication using a second communication method that is different than the first communication method.

6. The method of claim 5, wherein the platform can handle the first and second communication methods simultaneously.

7. The method of claim 1, wherein the platform comprises a rules engine for defining the method and mode of communication for a given user.

* * * * *